(12) United States Patent
Stiesdal

(10) Patent No.: US 8,251,656 B2
(45) Date of Patent: Aug. 28, 2012

(54) ACTUATION SYSTEM FOR A WIND TURBINE BLADE FLAP

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 1149 days.

(21) Appl. No.: 12/151,404

(22) Filed: May 6, 2008

(65) Prior Publication Data

US 2008/0292461 A1 Nov. 27, 2008

(30) Foreign Application Priority Data

May 25, 2007 (EP) .................................... 07010506

(51) Int. Cl.
*B64C 3/46* (2006.01)
(52) U.S. Cl. ............ 416/23; 416/146 R; 416/228; 416/1
(58) Field of Classification Search ................ 416/1, 23, 416/146 R, 228
See application file for complete search history.

(56) References Cited

U.S. PATENT DOCUMENTS

| | | | |
|---|---|---|---|
| 2,616,509 A | | 11/1952 | Thomas |
| 3,047,257 A | * | 7/1962 | Chester .......................... 244/226 |
| 3,987,984 A | | 10/1976 | Fischer |
| 3,988,889 A | * | 11/1976 | Chamay et al. .............. 60/226.2 |
| 4,298,313 A | | 11/1981 | Hohenemser et al. |
| 4,349,169 A | * | 9/1982 | McAnally ..................... 244/219 |
| 5,320,491 A | * | 6/1994 | Coleman et al. ................ 416/24 |
| 7,632,068 B2 | * | 12/2009 | Bak et al. ........................ 416/23 |
| 2006/0145483 A1 | | 7/2006 | Larsen et al. |

FOREIGN PATENT DOCUMENTS

| | | |
|---|---|---|
| DE | 102 33 102 A1 | 1/2004 |
| EP | 1524431 A1 * | 4/2005 |
| EP | 1 666 723 A1 | 6/2006 |
| JP | 2006248456 A | 9/2006 |
| WO | WO 00/75508 A1 | 12/2000 |
| WO | WO 2007/045940 A1 | 4/2007 |
| WO | 2008132235 A1 | 11/2008 |

OTHER PUBLICATIONS

Martin Recksiek, Eycl, "Hochauftriebssysteme—von der Flugzeugkonfiguration zur Systementwicklung", HAW Hamburg, Dec. 16, 2004, pp. 1-43, Airbus, an EADS Joint Company with BAE Systems, Deutschland GmbH.

* cited by examiner

*Primary Examiner* — Ninh H Nguyen

(57) ABSTRACT

Actuation system for a wind turbine blade flap.

A method of actuating a flap (9) in a wind turbine rotor blade (1) is provided wherein a fluid is used for reversibly expanding an actuating element (16, 17, 19) acting a movable part (13) of the flap by varying the fluid pressure in the actuating element (16, 17, 19). Further, a wind turbine rotor with a rotor blade (1) comprising a flap (9) and a flap actuating system, where the flap comprises a fixed part (12) that is fixed to the rotor blade (1) and a movable part (13) that is movable relative to the fixed part (12), is disclosed, in which the flap actuating system comprises an actuating element (16, 17, 19) with a reversible changeable volume located between the movable part (13) of the flap and the fixed part (12) of the flap, a fluid within the actuating element (16, 17, 19) the pressure of which is settable and a pressure setting device which is designed to press fluid into or release fluid from the element (16, 17, 19) as to change its volume.

10 Claims, 4 Drawing Sheets

ACTUATION SYSTEM FOR A WIND TURBINE BLADE FLAP

CROSS REFERENCE TO RELATED APPLICATIONS

This claims the benefits of European application No. 07010506.9 filed May 25, 2007 and is incorporated by reference herein in its entirety.

FIELD OF INVENTION

The present invention relates to a method of flap regulation of a wind turbine blade and a flap which allows such a regulation.

BACKGROUND OF THE INVENTION

In the context of wind turbine rotor blades it is generally intended to reduce the loads on the wind turbine blades. Until now the wind turbine blades and supporting structures are usually dimensioned so that they are able to withstand the dynamic loading that can occur under the conditions to which the turbine is certified. But for large wind turbines very heavy designs with enormous operational loads are the result of this practice. Consequently, various methods have been developed for an active reduction of operational loads.

One method for an active reduction of operational loads is cyclic blade pitch as it is, e.g. described in U.S. Pat. No. 4,298,313. In the cyclic blade pitch the blade's pitch angle is varied during a rotational period of the rotor. Cyclic blade pitch can be regulated by simple or advanced means, using the normal blade pitching system. Pitch control systems are, e.g., described in EP 1 666 723 A1 or US 2006/0145483 A1. A disadvantage of cyclic pitch is wearing on pitch actuator systems and pitch bearings. Moreover, the regulation speed is limited, typically with response times in the order of seconds, because cyclic pitch requires the movement of large inertial masses in bearings with large frictional moments.

More recently various forms of active flap regulation have been described. In an active flap regulation the pitch setting is typically not changed. Instead, the aerodynamic characteristics of the blade are modified by a flap action, thereby enabling a desired response to the structural loading. A method of controlling aerodynamic load of a wind turbine by means of flaps is, e.g. described in US 2006/0145483 A1. A specific advantage of active flap regulation is a faster regulation speed than for cyclic pitch. Due to the limited inertia of a flap the regulation reaches typical response times in the order of tenth of seconds. The main weaknesses of known flaps are the required complex actuators, typically electrical systems that may be highly vulnerable to especially lightning damage.

SUMMARY OF INVENTION

It is therefore an objective of the present invention to provide an advantageous method of actuating a flap of a wind turbine blade, which overcomes the mentioned disadvantages. It is a further objective to provide a wind turbine rotor, which allows an advantageous flap regulation.

These objectives are solved by a method of actuating a flap in a wind turbine rotor blade, as claimed in the claims, and by a wind turbine rotor, as claimed in the claims. The depending claims define further developments of the invention.

The present invention generally discloses a method and a device for load reduction on wind turbine blades. The method is based on flap regulation by non-electrical means.

In the inventive method of actuating a flap in a wind turbine rotor blade a fluid is used for reversibly expanding an actuating element acting on a movable part of the flap by varying the fluid pressure in the actuating element. When no pressure is applied to the actuating element, the flap is, e.g. elastically, restored to its neutral position. When pressure is applied, the actuating element expands, deforms the flap and thereby deploys it in a desired direction. The deployed flap changes the aerodynamic properties of the blade profile and thereby the aerodynamic loads.

The used fluid may be, e.g., air, compressed air, water with or without an anti-freeze agent or hydraulic oil. The fluid pressure in the actuating element can be regulated by a regulator responding to loads of the turbine blade or the supporting structure.

The inventive wind turbine rotor with a rotor blade comprises a flap and a flap actuating system, where the flap comprises a fixed part that is fixed to the rotor blade and a movable part that is movable relative to the fixed part. The rotor may comprise any number of rotor blades, but in any case at least one. However, as three-bladed rotors are the most common rotor blades, the inventive rotor may, in particular, comprise three rotor blades. The flap actuating system further comprises an actuating element with a reversibly changeable volume located between the movable part of the flap and the fixed part of the flap, a fluid within the actuating element the pressure of which is settable and a pressure setting device which is designed to press fluid into, or release fluid from, the actuating element so as to change its volume.

The pressure setting device can comprise a compressor or a pump to which the actuating element is in flow connection. Further, the pressure setting device may include or be connected to a controller acting on the compressor or pump so as to press fluid into or release fluid from the actuating element according to a pressure set by the controller. In particular, the controller can comprise a fluid pressure regulator responding to loads acting on the turbine blade or the supporting structure. The used fluid may be, e.g., air, compressed air, water with or without an anti-freeze agent or hydraulic oil.

Generally, the actuating element can be a fluid hose, for instance a compressed air hose. The hose may be a standard product. In addition, the actuating element can have a flat cross-section in the deflated state, which would allow for easier fitting into the flap, or it can be folded which would increase the usable volume of the actuating element without significantly increasing the space required between the fixed part of the flap and the movable part of the flap. Furthermore, the actuating element can be integrated into the flap as an inner cavity which would allow it to form together with the flap so that no discrete add-on to the flap is necessary.

Moreover, the inventive flap can preferably be mounted along the full length of the trailing edge from the shoulder to the tip point. The chordwise dimension of the inventive flap can be fixed, independent of the radial position or the chordwise dimension can vary dependent on the radial position.

Generally, the inventive flap can be manufactured as an extruded profile. The inventive flap can be made of plastic, wood, thermoplastic material, composite material, fibre reinforced composite material or other raw material.

The flap may be composed continuously or as a series of flap elements which are located at different radial positions. The latter allows an easier handling and fitting of the flap. Further, the flap can have an external protrusion which is beneficial for easy deformation as desired under pressure.

The general advantage of the inventive method and the inventive wind turbine rotor lies in the replacement of known flap system actuators, typically complex arrangements based on electrical subsystems and electromechanical actuators and mechanisms. These known flap system actuators are now replaced by a very simple and cheap combination of a shape-changing actuation body and a suitably shaped flap structure. The described solution has the further advantage that it completely eliminates the need for electrical systems outboard of the blade root. All active systems can be located in the rotor hub and the actuation is performed by means that do not require service and are not vulnerable to, in particular, lightning strike.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
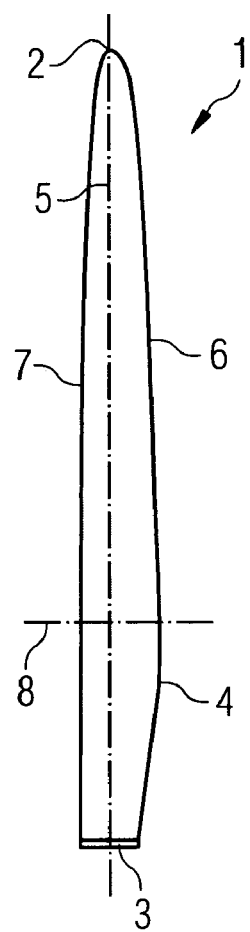
FIG. 1 schematically shows a wind turbine rotor blade in a top view.

Now a first embodiment will be described with reference to FIGS. 1 to 4. FIG. 1 schematically shows a typical wind turbine rotor blade 1 in a top view. One can see in FIG. 1 the characteristic geometrical features of a turbine blade which are the blade root 3, the shoulder 4, the tip point 2, the leading edge 7, the trailing edge 6, the span line 5 and the chord line 8. At the blade root 3 the rotor blade is mounted to a rotor hub. The tip point 2 characterises the maximum radial position of the blade, measured from the blade root 3 along the span 5.

The span line 5 connects the blade root 3 with the tip point 2. The chord line 8 indicates the direction perpendicular to the span line 5. Chord means the maximum width of the turbine blade perpendicular to the span 5. Shoulder 4 means the radial position, measured from the blade root 3, where the chord has its maximum value. The trailing edge 6 is the downstream edge of the blade and extends from the blade root 3 along the shoulder 4 to the tip point 2. The leading edge 7 is the upstream edge extending from the blade root 3 to the tip point 2.

Figure 2:
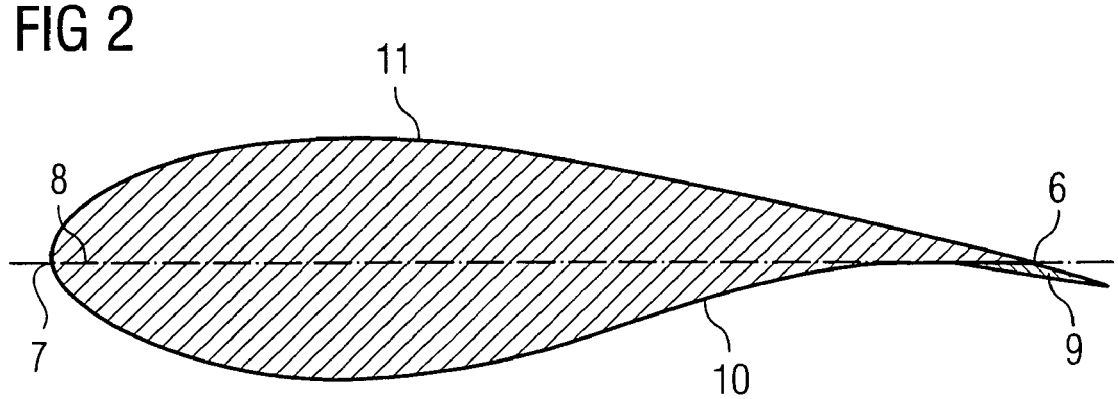
FIG. 2 schematically shows a wind turbine rotor blade in a sectional view with an inventive flap in a neutral state.

FIG. 2 schematically shows a wind turbine rotor blade in a sectional view along the chord line 8 with an inventive flap in a neutral state. One can see in FIG. 2 the chord line 8, the leading edge 7, the trailing edge 6 and the flap 9 which is located at the trailing edge 6. The flap 9 is mounted along the full length of the trailing edge 6 from the shoulder 4 to the tip point 2. Moreover, the chordwise dimension of the flap 9 is fixed, independent of the radial position. Further, one can see in FIG. 2 the concave pressure side 10 extending from the leading edge 7 to the trailing edge 6 and the convex suction side 11 extending from the leading edge 7 to the trailing edge 6.

Figure 3:
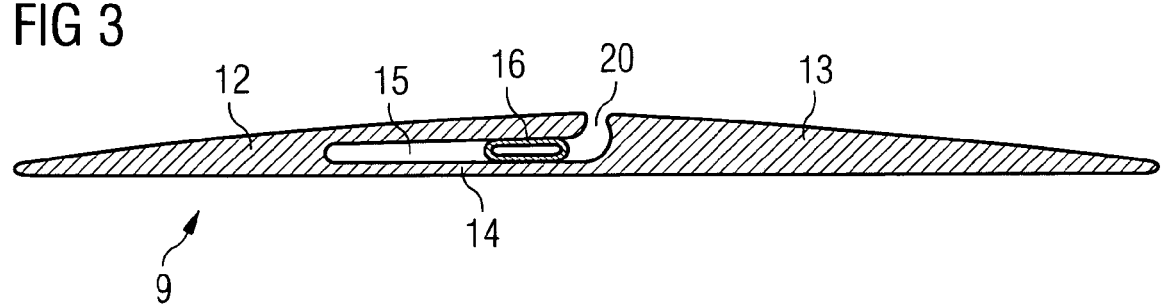
FIG. 3 schematically shows an inventive flap in a neutral state in a sectional view.

FIG. 3 schematically shows an inventive flap 9 in a neutral state in a sectional view. The flap 9 comprises a fixed part 12 by which it is fixed to the rotor blade 1, a movable part 13, a hinge 14, a cavity 15 and a fluid hose 16. The fixed part 12 is firmly mounted to the trailing edge 6 of the blade 1. The movable part 13 is connected to the fixed part 12 by a hinge 14 that is, in the present embodiment, realised by a thin section of flap material. A cavity 15 is formed between the fixed part 12 of the flap and the hinge 14. In the present embodiment the cavity 15 has an opening 20 which is located opposite to the hinge 14 between the fixed part 12 and the movable part 13. The opening 20 allows a movement of the movable part 13 relative to the fixed part 12 at the hinge 14.

An elastic fluid hose 16, which is, in the present embodiment, a compressed air hose extends along the trailing edge of the blade 1 through the cavity 15. The hose 16 forms an actuating element which actuates the movable part 13 of the flap so as to move relative to the fixed part 12. It is connected to a compressor which, in the embodiment, allows compressed air to be pressed into the fluid hose 16. Alternatively to compressed air, water with or without an anti-freeze agent, hydraulic oil or any other type of fluid can also be used.

Instead of a compressor, a pump could be used as well. Using a pump would provide a pressure setting device which is not only able to press fluid into, but also suck fluid out of the hose 16.

The flap 9 is preferably manufactured of thermoplastic material. Alternatively, it may be made of plastic, wood, composite, fibre reinforced composite material or other raw material. Advantageously the flap is mounted along the full length of the trailing edge 6 from the shoulder 4 to the tip point 2. The flap 9, as it is shown in FIG. 3, is elastically restored to its neutral position when the hose is deflated due to resilient properties of the hinge 14. If a pump is used instead of a compressor, the restoration can be assisted by sucking the fluid out of the hose 16. In its neutral state the fluid hose 16 is flat.

Figure 4:
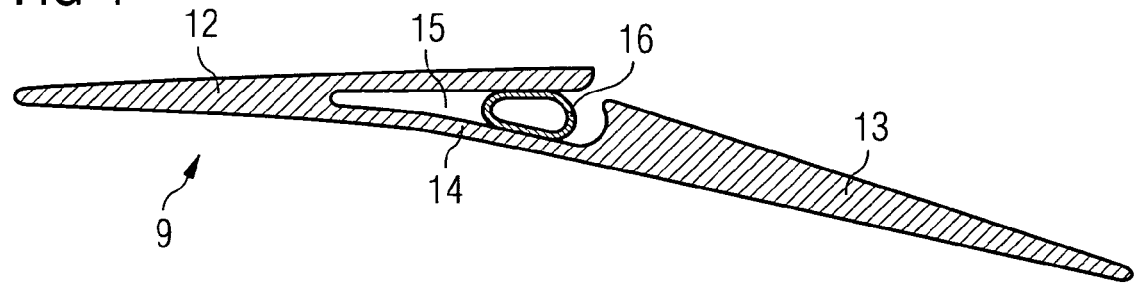
FIG. 4 schematically shows an inventive flap in a partially deployed state in a sectional view.

Compressed air is pressed into the fluid hose 16 to deploy the movable part 13 of the flap. FIG. 4 schematically shows the flap 9 of FIG. 3 in a partially deployed state in a sectional view. One can see in FIG. 4 the inflated and expanded volume of the fluid hose 16 which presses against the hinge 14 and thereby actuates the moveable part 13 of the flap 9.

The adjustment of the flap 9 can be regulated by the pressure of the compressed air. This regulation can be achieved by a regulator responding to loads of the turbine blade or the supporting structure and applying a specific magnitude of pressure to the fluid hose.

Figure 5:
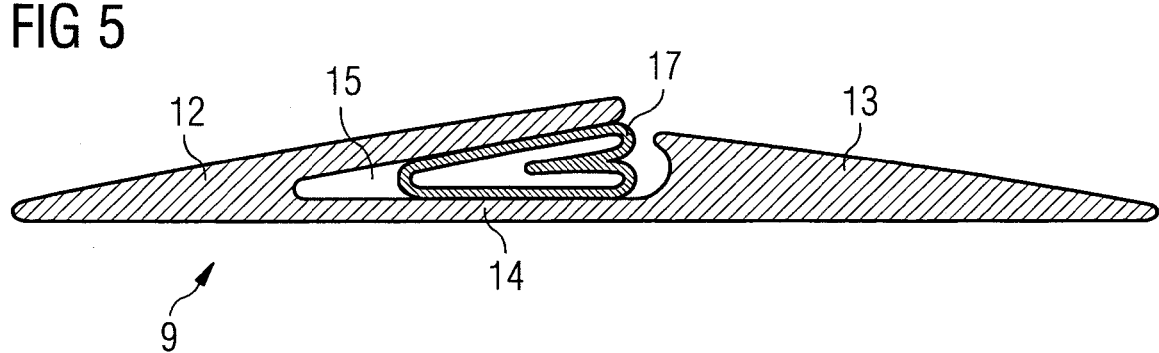
FIG. 5 schematically shows, in a sectional view, an inventive flap with a folded fluid hose in a neutral state.
Figure 6:
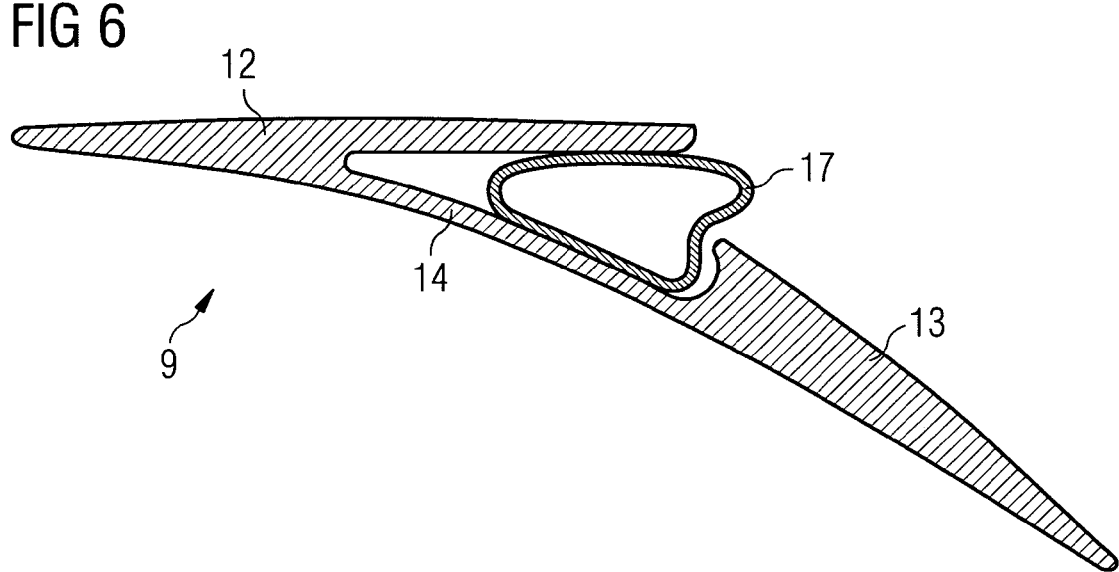
FIG. 6 schematically shows, in a sectional view, an inventive flap with a folded fluid hose in a partially deployed state.

A second embodiment will be described with reference to FIGS. 5 and 6. All elements corresponding to elements of the first embodiment are designated by the same reference numerals as in FIGS. 3 and 4 and will not be described again. FIG. 5 schematically shows, in a sectional view, an inventive flap 9 with a folded fluid hose 17 in a neutral state. Again, one can see the fixed part 12, the movable part 13, the hinge 14 and the cavity 15 between the fixed part 12 of the flap and the hinge 14, as already described in the first embodiment.

While pressing compressed air or any other mentioned fluid into the folded fluid hose 17 the hose expands by an unfolding of the fluid hose's folds. This is schematically shown in FIG. 6 where an inventive flap 9 with a folded fluid hose 17 in a partially deployed state is sketched in a sectional view. The folded fluid hose 17 provides an increased volume of the inflated fluid hose compared to the first embodiment and thus allows a more effective deployment of the flap 9.

Figure 7:
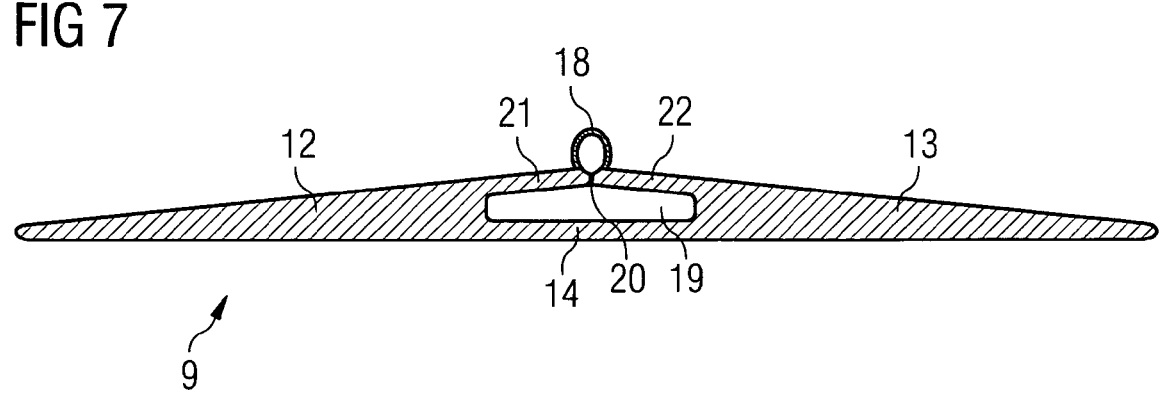
FIG. 7 schematically shows, in a sectional view, an inventive flap with integrated actuator in a neutral state.

Now a third embodiment will be described with reference to FIGS. 7 and 8. All elements corresponding to elements of the first embodiment are designated by the same reference numerals as in FIGS. 3 and 4 and will not be described again. FIG. 7 schematically shows, in a sectional view, an inventive flap 9 with an integrated actuating element in a neutral state. Besides the already described hinge 14, fixed part 12 and movable part 13 of the flap 9 one can additionally see in FIG. 7 an inner cavity 19 which is located between the hinge 14 and two wall sections 21, 22, one of which belongs to the fixed part of the flap and the other to the movable part, and a flexible element 18. The inner cavity 19, which has an opening 20 that is located opposite to the hinge 14 is sealed by the flexible element 18. The flexible element 18 extends over the opening 20 and connects the two wall sections 21, 22 of the flap so as to close the inner cavity 19. The hinge 14 is preferably designed to bend more easily in the direction towards the inner space of the inner cavity 19 than away from the inner space.

In this embodiment the inner cavity 19 is the actuating element which actuates the movable part 13 of the flap. In the neutral state of the flap, when no pressure is applied, the opening 20 is closed or nearly closed. When compressed air or any other mentioned fluid is pressed into the inner cavity 19 the volume of the cavity tends to increase. As a consequence, the wall sections 21, 22 are pressed apart so that the opening 20 increases. As the wall section 21 of the fixed part 12 is fixed to the blade's trailing edge it cannot move with respect to the blade 1. Therefore, all the movement is carried out by the wall section 22 of the movable part 13. This movement exerts a force on the movable part which tries to move the movable part 13 away from the fixed part 12. However, as the movable part 13 is connected to the fixed part 12 by means of the hinge 14, which prevents the movable part 13 from moving away from the fixed part 12, this movement "away" from the fixed part is transformed into a rotational movement about the hinge. As a consequence the flap is deployed.

Figure 8:
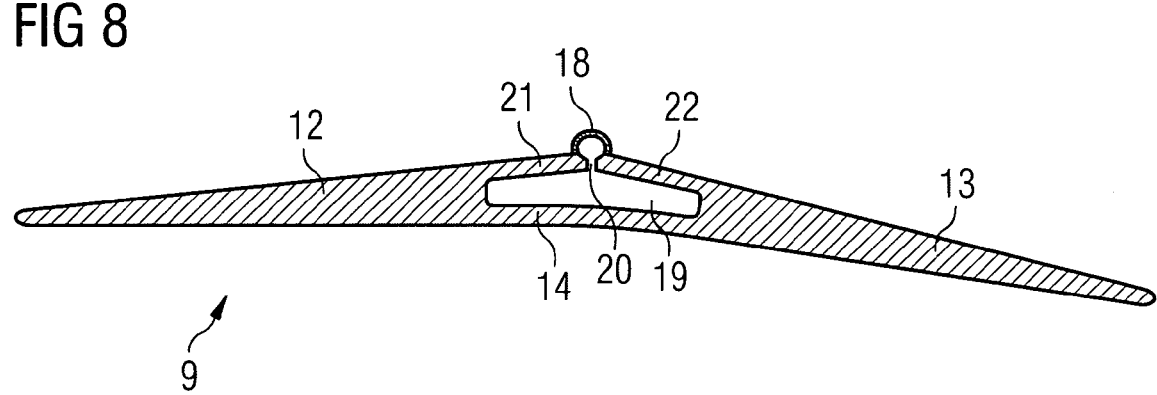
FIG. 8 schematically shows, in a sectional view, an inventive flap with integrated actuator in a partially deployed state.

The deployed state of the flap is sketched in FIG. 8 where the flap 9 with an integrated actuator is schematically shown in a sectional view. Compared to FIG. 7, one can see in FIG. 8 the changed shape of the flexible element 18. When the pressure in the inner cavity is released again, a resilient force of the flexible element 18 leads to a contraction which in turn pulls the wall sections 21, 22 towards each other so as to close the gap 20. By this action the flap returns to its neutral state. In the embodiment described with respect to FIGS. 7 and 8, the actuator is manufactured as part of the flap and no additional fluid hose is necessary.

The invention claimed is:

1. A method of actuating a flap in a wind turbine rotor blade, comprising:
   arranging a movable part of the flap in the rotor blade;
   arranging a fixed part of the flap, wherein the fixed part is fixed to the rotor blade and wherein the movable part and the fixed part are connected by a thin section of flap material;
   reversibly expanding an actuating element by varying a fluid pressure in the actuating element wherein the actuating element is located between the movable part and the fixed part; and
   actuating a movable part of the flap by the actuating element wherein movement of the movable part occurs at the thin section.

2. The method, as claimed in claim 1, wherein the fluid is selected from the group consisting of: air, compressed air, water, water with an anti-freeze agent, and hydraulic oil.

3. The method, as claimed in claim 1, wherein the fluid pressure in the actuating element is regulated by a regulator responding to loads of the turbine blade or the supporting structure.

4. A wind turbine rotor with a rotor blade, comprising:
   a flap arranged along a full length from a shoulder to a tip point of a trailing edge of the rotor blade where the flap is fabricated from a raw material and the flap has
     a fixed portion fixed to the rotor blade, and
     a movable portion that is movably attached to the fixed portion wherein the flap has an external protrusion and a dimension of the flap varies dependent on a radial position; and
   an actuating system that actuates the flap, wherein the actuating system has
     a reversibly changeable volume arranged between the movable portion of the flap and the fixed portion of the flap,
     a fluid within the actuating element the pressure of which is settable, and
     a pressure setting device designed to press fluid into or release fluid from the actuating element as to change its volume and wherein the actuating element is integrated into the flap as an inner cavity.

5. The wind turbine rotor as claimed in claim 4, wherein the actuating element is a fluid hose.

6. The wind turbine rotor as claimed in claim 4, wherein the fluid is selected from the group consisting of: air, compressed air, water, water with an anti-freeze agent, and hydraulic oil.

7. The wind turbine rotor as claimed in claim 4, wherein the actuating element has a flat section or is folded.

8. The wind turbine rotor as claimed in claim 4, wherein a dimension of the flap is fixed, independent of a radial position.

9. The wind turbine rotor, as claimed in claim 4, wherein the flap is composed continuously or as a series of flap elements arranged at different radial positions.

10. The wind turbine rotor as claimed in claim 4, wherein the flap actuating system comprises a fluid pressure regulator that responds to loads of the turbine blade or the supporting structure.

* * * * *